(12) United States Patent
Shen et al.

(10) Patent No.: US 7,694,014 B2
(45) Date of Patent: Apr. 6, 2010

(54) AUTOMATIC RELAXING AND REVISING OF TARGET SERVER SPECIFICATIONS FOR ENHANCED REQUESTS SERVICING

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 11/830,292

(22) Filed: Jul. 30, 2007

(65) Prior Publication Data

US 2009/0037599 A1 Feb. 5, 2009

(51) Int. Cl.
*G06F 13/00* (2006.01)

(52) U.S. Cl. .................... 709/238; 709/225; 709/250

(58) Field of Classification Search ............. 709/220, 709/223, 224, 225, 230, 238, 250
See application file for complete search history.

(56) References Cited

U.S. PATENT DOCUMENTS 6,073,165 A * 6/2000 Narasimhan et al. ........ 709/206
7,080,101 B1 * 7/2006 Watson et al. .............. 707/201
7,392,302 B2 * 6/2008 Halpern .................... 709/223
2004/0225708 A1 * 11/2004 Christodoulou et al. ..... 709/200

* cited by examiner

*Primary Examiner*—Viet Vu
(74) *Attorney, Agent, or Firm*—Dillon & Yudell LLP (57) ABSTRACT

A method, system and computer program product for dynamically modifying target server specifications to improve the success rate of client requests in a data network. A client's initial request is transmitted by a client router to a dynamically updating target server, based on information in a client's routing table. A Dynamic Server Specifications (DSS) utility automatically revises one or more target specifications of a client's request that is not initially fulfilled. The DSS utility then initiates the transmission of the modified request to an alternate server. If the request to the alternate server is also not fulfilled, the DSS utility may further modify the request to target an arbitrary server in order to download a current routing table. When the client receives a current routing table, the initial request is revised based on the current routing information, with full constraints re-established, and forwarded to the relevant target server.

20 Claims, 4 Drawing Sheets

AUTOMATIC RELAXING AND REVISING OF TARGET SERVER SPECIFICATIONS FOR ENHANCED REQUESTS SERVICING

BACKGROUND OF THE INVENTION

1. Technical Field

The present invention generally relates to data networks and in particular to client requests in data networks. Still more particularly, the present invention relates to the fulfillment of client requests in data networks.

2. Description of the Related Art

Internet computing has become increasingly important in modern business and in people's daily lives. This increasing importance is also accompanied by greater network routing demands. The simple traditional symmetric cluster routing (infrastructure) which utilizes a set of servers that deploy the identical service in all of the servers is incapable of meeting millions of concurrent and dynamically changing client requests. In a simple symmetric cluster, several servers host the same services and access to any service may be obtained from any server. In the symmetric grid or cluster, deploying all services to all endpoints is very inefficient because there are different demands for different services. For example, given a grid/cluster of 5000 server endpoints and 9000 different services, if 9000 services are deployed into all of 5000 servers, complexities and inefficiencies abound since all of these 9000 different services have different demands and requirements. Of even greater complexity is a solution which comprises 9000 clusters of 5000 servers and which deploys each of 9000 services to each of 9000 clusters.

However, Web Services, Service-Oriented Architecture, and Asymmetrical Cluster routing infrastructures are capable of meeting the requirements of millions of diverse applications and services. In addition, millions of concurrent client requests may be met with neither (1) any over-deployment of servers/resources being under-loaded from insufficient traffic, nor (2) any under-deployment bottleneck caused by overloading traffic. However, transferring a very complicated and dynamically changing routing table to a client in order to guide routing decisions is one of the more difficult problems that differentiate new asymmetric cluster/grid routing from simple traditional cluster routing.

The asymmetric cluster solution is to deploy each of the (previously referenced) 9000 services onto a subset of 5000 server endpoints according to each service's demand, and each server endpoint may have a different role and unique set of resources allocated for different services at different times. Thus, asymmetric clusters function as the modern dynamic infrastructure for service-oriented architectures. With an asymmetric cluster (routing) infrastructure, grid/cluster and application management is simplified, and an enterprise has full control with this infrastructure. However, routing in an asymmetric cluster is much more complicated due in part to the dynamic assignment of roles and services to servers.

SUMMARY OF THE EMBODIMENTS

Disclosed is a method, system and computer program product for dynamically modifying target server specifications in order to improve the success rate of client requests in a data network. A client's initial request is transmitted via a client router to a dynamically updating target server, based on information in a client's routing table. A Dynamic Server Specifications (DSS) utility automatically modifies one or more target server specifications by relaxing the request constraints of the client's request when the request is not initially fulfilled. The DSS utility then initiates the transmission of the modified request to an alternate server to obtain a current routing table. The DSS utility employs an epoch, i.e., a timestamp, to determine whether the client's routing table is the most current. The client's routing table is current and access is granted when the epoch of the client's routing table is equivalent to the epoch of the target server's routing table. When the epochs of the client and the responsive target server are different, the more current routing table is automatically downloaded to the client from the responsive server. If the request to the alternate server is not fulfilled, the DSS utility further modifies the request to target any other server, in order to download the current routing table. When the client receives the current routing table, the client revises the initial request based on the current routing information, with full constraints re-established, and the client forwards the request to the appropriate target server.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system and computer program product for dynamically modifying target server specifications in order to improve the success rate of client requests in a data network. A client's initial request is transmitted via a client router to a dynamically updating target server, based on information in a client's routing table. A Dynamic Server Specifications (DSS) utility automatically modifies one or more target server specifications by relaxing the request constraints of the client's request when the request is not initially fulfilled. The DSS utility then initiates the transmission of the modified request to an alternate server to obtain a current routing table. The DSS utility employs an epoch, i.e., a timestamp, to determine whether the client's routing table is the most current. The client's routing table is current and access is granted when the epoch of the client's routing table is equivalent to the epoch of the target server's routing table. When the epochs of the client and the responsive target server are different, the more current routing table is automatically downloaded to the client from the responsive server. If the request to the alternate server is not fulfilled, the DSS utility further modifies the request to target any other server, in order to download the current routing table. When the client receives the current routing table, the client revises the initial request based on the current routing information, with full constraints re-established, and the client forwards the request to the relevant target server, as identified by the current routing table.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

Figure 1:
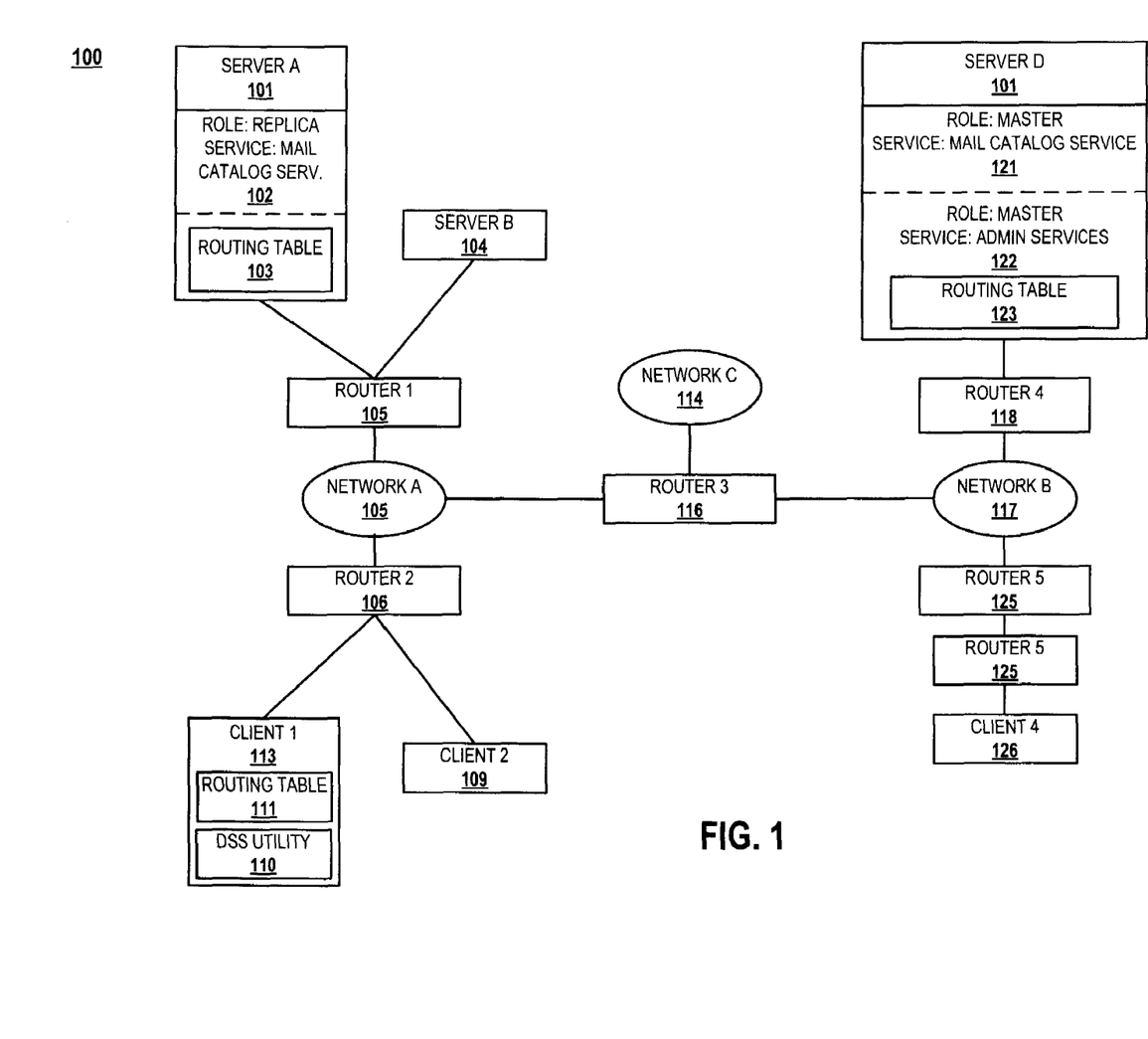
FIG. 1 is a block diagram illustrating an asymmetrical and role based network server cluster, according to an illustrative embodiment of the present invention.

With reference now to the figures, FIG. 1 is a block diagram illustrating an asymmetrical and role based server cluster, according to an illustrative embodiment of the present invention. Cluster 100 comprises Server A 101 and Server B 104, which both connect to network A 106 via router 1 105. Also connected to network A 106 are Client 1 113 (which includes routing table 111 and DSS utility 110) and Client 2 112, which both connect to network A 106 via router 2 109. Route 3 116 connects network A 106 to both Network B 117 and Network C 114. Server D 120 connects to Network B 117 via router 4 118. Client 4 126 connects to network B 117 via router 5 125.

In cluster 100, server A 101 hosts first mail catalog service with a replica role in partition-A 102. Server A 101 also includes routing table A 103. Server D 120 hosts second mail catalog service with the master role in first partition-D 121. Server D 120 hosts administrative service with the master role in second partition-D 122. Server D 120 also includes routing table D 123.

Cluster 100 is an example of an asymmetric cluster in which a server hosts different services and has different roles at different times. Routing table 103, for example, is defined as a tuple of roles, services, and server endpoints. In cluster 100, the client's routing table is always one step lag behind the server's routing table. An epoch mechanism is used to initiate an update to a client routing table when there is any server routing table change. The epoch changes every time server endpoints change, server services change, or server service roles change. Thus, the epoch is a timestamp of server changes. A client router, for example, router 2 109, routes requests according to a client routing table. Whenever a client transmits a request, the epoch of the client routing table is inserted into the client request stream. When the target server receives the client request stream, the server first reads the epoch and compares the client epoch with the server's routing table epoch (server epoch). If the client epoch equals the server epoch, there is no change in the server routing table since the last client routing table update. If the client epoch is not equal to the server epoch, the server routing table has changed since the last client routing table update, and a new routing table is automatically inserted into the client response stream by the server for the client to update the client's routing table.

During initialization, there are empty roles and services in the client routing table, which prevents the client router from accessing accurate routing information. Dynamic server specifications (DSS) utility 110 relaxes the service and role constraints and contacts any arbitrary server, which may not host the desired/intended request service with the intended role. DSS utility 110 contacts any server endpoint in the cluster with a flag of −1 as the epoch. Consequently, a current server routing table is downloaded via the client request response stream, and the client router utilizes the client's newly downloaded routing table to route the request while specifying the target server, the server's role and the service. For example, a client may not know which server hosts a particular service with a specific role because the client routing table may be empty. The client may pick any arbitrary server endpoint, for example, "server B", and send a request to server B. When server B receives the request, server B returns a server routing table to the client. The client then updates the client routing table and selects the right target for the current request.

DSS utility 110 provides service continuity even when a request is sent to a dead/non-responsive target server. The client's routing table may show that "server E", for example, is the master server for a requested "service 986". The client sends a request to server E; however, server E is dead. The client is unable to download any new routing table from server E. As a result, the client's routing table remains unchanged. According to the client's routing table, only one server has the master role for service 986. The indicated master role for this service is server E but server E is currently dead. Without DSS utility 110, the client is unable to determine which server has the current master role for service 986. However, DSS utility 110 provides a solution by relaxing the (master) role constraints. DSS utility 110 selects a server with an alternate or replica server role for service 986 after the client initially fails to contact the server holding the master role for service 986, based on a time out period for a response. In one embodiment, the replica may be selected as the alternate role based on a hierarchy of roles and services provided with the routing table. If any server with a replica role for service 986 is reachable, DSS utility 110 initiates a download of the current routing table to the client (router), which routing table is utilized by the client to update the client router. The updated routing information may be utilized to guide the current request. If no replica role for service 986 is reachable, DSS utility 110 relaxes the specifications even more. DSS utility 110 searches for any server endpoint to host any service in any role. Once this server endpoint is reachable, DSS utility 110 initiates the download of the current routing table to the client (router).

Figure 2:
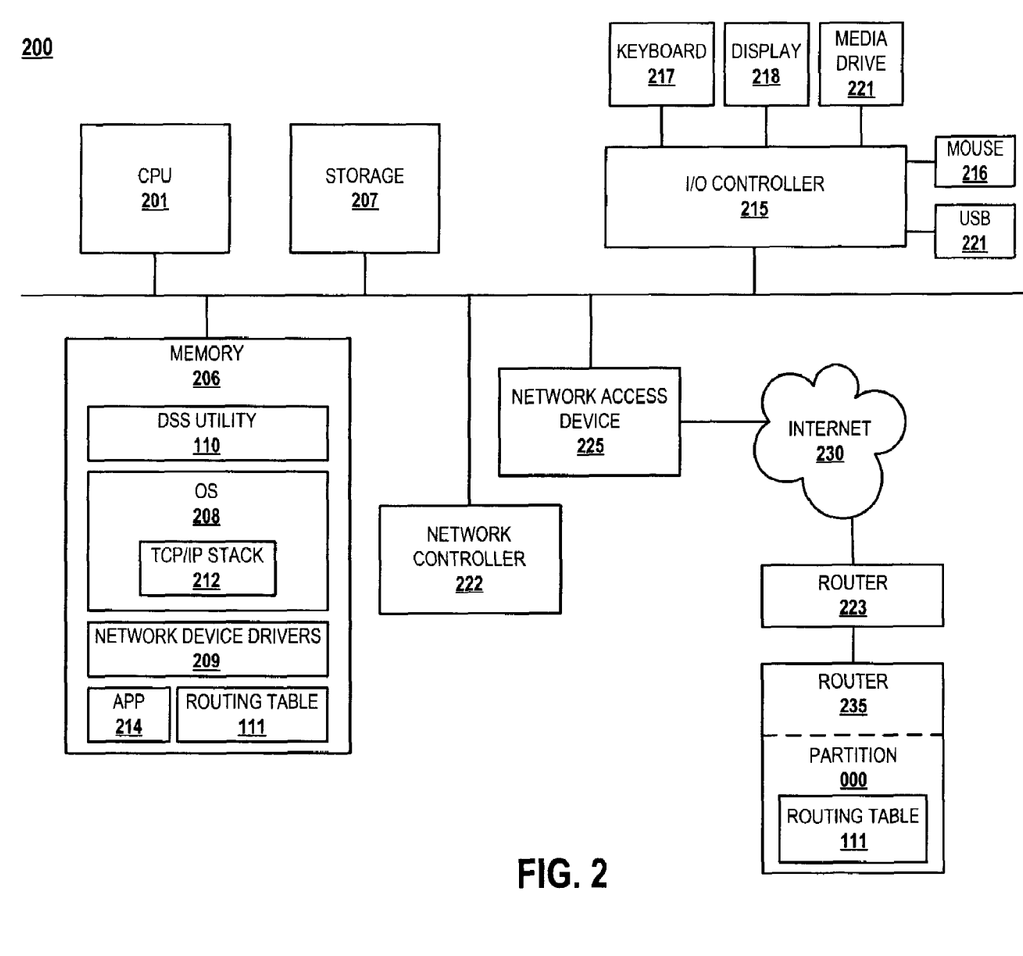
FIG. 2 is a block diagram illustrating a data processing system within which features of the invention may be advantageously implemented.

Referring now to FIG. 2, there is depicted a block diagram representation of a network-connected data processing system within which features of the invention may be advantageously implemented. Data processing system (DPS) 200 may represent a client, client router, or a server in an asymmetric network cluster. DPS 200 comprises at least one processor or central processing unit (CPU) 201 coupled to a memory 206 via a system bus/interconnect 202. Also coupled to system bus 202 is an input/output controller (I/O Controller) 215, which provides connectivity and control for input devices, of which pointing device (or mouse) 216 and keyboard 217 are illustrated. I/O Controller 215 also controls access to output devices, of which display 218 is illustrated. Additionally, a multimedia drive 219 (e.g., CDRW or DVD drive) and USB (universal serial bus) hub 221 are illustrated, coupled to I/O controller. Multimedia drive 219 and USB hub 221 may operate as both input and output (storage) mechanisms. DPS 200 also comprises storage 207, within which data/instructions/code may be stored.

DPS 200 further comprises network access device (NAD) 225 by which DPS 200 is able to connect to and communicate with an external device or network (such as the Internet and/or a local area network (LAN)). NAD 225 may be a modem or network adapter and may also be a wireless transceiver device. Controlling access to NAD 225 is Network Controller 222. As shown, DPS 200 (when utilized as a client) connects to one or more servers 235 via an access network, such as Internet 230 via client router 233.

In the described embodiments, Internet 230 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 200, various features of the invention are completed via software (or firmware) code or logic stored within memory 206 or other storage (e.g., storage 207) and executed by CPU 201. Among the software code are code for directing routing requests (e.g., via routing table 111), code for enabling network connection and communication via NAD 225, and more specific to the invention, code for enabling the dynamic routing table update (server specifications) features described below. For simplicity, the collective body of code that enables the dynamic server specifications features is referred to herein as the dynamic server specifications (DSS) utility. In actual implementation, the DSS utility may be added to existing operating system (OS) code or other existing code to provide the DSS functionality described below.

Thus, as shown by FIG. 2, in addition to the above described hardware components, data processing system 200 further comprises a number of software components, including operating system (OS) 208 (e.g., Microsoft Windows®, a trademark of Microsoft Corp, or GNU®/Linux®, registered trademarks of the Free Software Foundation and The Linux Mark Institute), one or more software applications 214 and DSS utility 110. In implementation, OS 208 and DSS utility 110 are located within memory 206 and executed on processor (CPU) 201. According to the illustrative embodiment, when CPU 201 of a client data processing system or client router executes DSS utility 110, DSS utility 110 enables data processing system 200 to complete a series of functional processes, including: (1) automatically modifying a target server specification by relaxing the constraints of a request requirement, when a request to a target server is not fulfilled; (2) initiating the transmission of the modified request to an alternate server to obtain a current routing table; (3) updating a client routing table to enhance the routing success rate; and other features/functionality described below and illustrated by FIGS. 3-4. In one alternate embodiment, when CPU 201 of a server data processing system executes DSS utility 110, DSS utility 110 enables data processing system 200 to complete a series of several-level functional processes, including: (1) automatically updating a server routing table based on detected (or broadcast) changes within the network; (2) automatically responding to a client request that has a table with an earlier/out-dated routing table by transmitting to the client router a copy of the current routing table; and (3) dynamically responding to receipt of a pre-defined epoch value (e.g., an epoch of −1) within a received request by transmitting a copy of the current routing table to the client router from which the request originated.

Those of ordinary skill in the art will appreciate that the hardware and basic configuration depicted in FIG. 2 may vary. For example, other devices/components may be used in addition to or in place of the hardware depicted. The depicted example is not meant to imply architectural limitations with respect to the present invention.

In an asymmetric cluster, each server endpoint may host different services at different times. Application placement assigns different services into different subsets/partitions of a server (endpoint) according to service demand. In addition, service may be dynamically removed from one server endpoint and/or service may be added to another server endpoint at any time.

Figure 3:
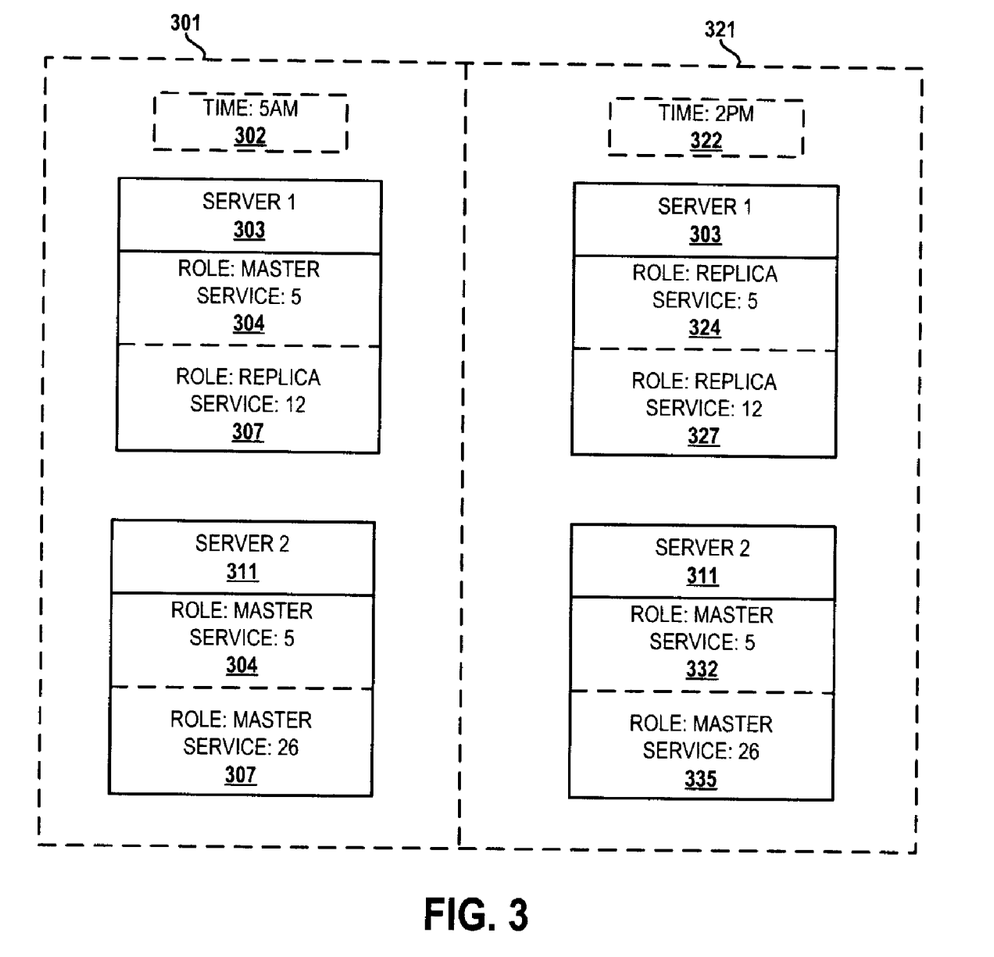
FIG. 3 is a block diagram representation of two dynamic servers with assigned roles and services at two different time periods, illustrating the dynamic advanced placement of servers, services and roles, according to an illustrative embodiment of the present invention.

Turning now to FIG. 3, which is a block diagram representation of two dynamic servers with assigned roles and services at two different time periods. The dynamic advanced placement of servers, services and roles is illustrated, according to an illustrative embodiment of the present invention. Server partition 300 comprises first time frame 301 and second time frame 321. First time frame 301 comprises first clock display 302, server 1 303 and server 2 311. Second time frame 321 comprises second clock display 322, server 1 303 and server 2 311.

At 5 am indicated by first clock display 302, server 1 303 comprises first sub-partition 1 304 and second sub-partition 1 307. In first sub-partition 1 304, server 1 303 is the master for service 5. Server 1 303 has the replica role in second sub-partition 1 307 for service 12.

At 5 am, server 2 311 comprises first sub-partition 2 312 and second sub-partition 2 315. In first sub-partition 2 312, server 2 311 takes the role of replica for service 5. Server 2 311 has the master role in second sub-partition 2 315 for service 26.

In second time frame 321, at 2 pm indicated by second clock display 322, server 1 303 comprises third sub-partition 1 324 and fourth sub-partition 1 327. In third sub-partition 1 324, server 1 303 takes the role of replica for service 5. Server 1 303 has a replica role in fourth sub-partition 1 327 for service 24.

At 2 p, server 2 311 comprises third sub-partition 2 332 and fourth sub-partition 2 335. In third sub-partition 2 332, server 2 311 is the master for service 5. Server 2 311 has the master role in fourth sub-partition 2 335 for service 26.

One server endpoint may host many different services at different times. For example, server 1 303 hosts service 5, and service 12 at 5 am; and the same server (server 1 303) hosts service 5 and service 24 at 2 pm. Different server endpoints may host different set of services. Alternatively, different endpoints may even host the same service but may have different roles for this same service. For example, in first time frame 301, server 1 303 and server 2 311 both host service 5, but server 1 303 has the master server role to maintain data integrity for service 5 while server 2 311 is a replica server role for service 5. In server partition 300, server 2 311 has the master role for service 26 in first time frame 301 and also in second time frame 321.

Figure 4:
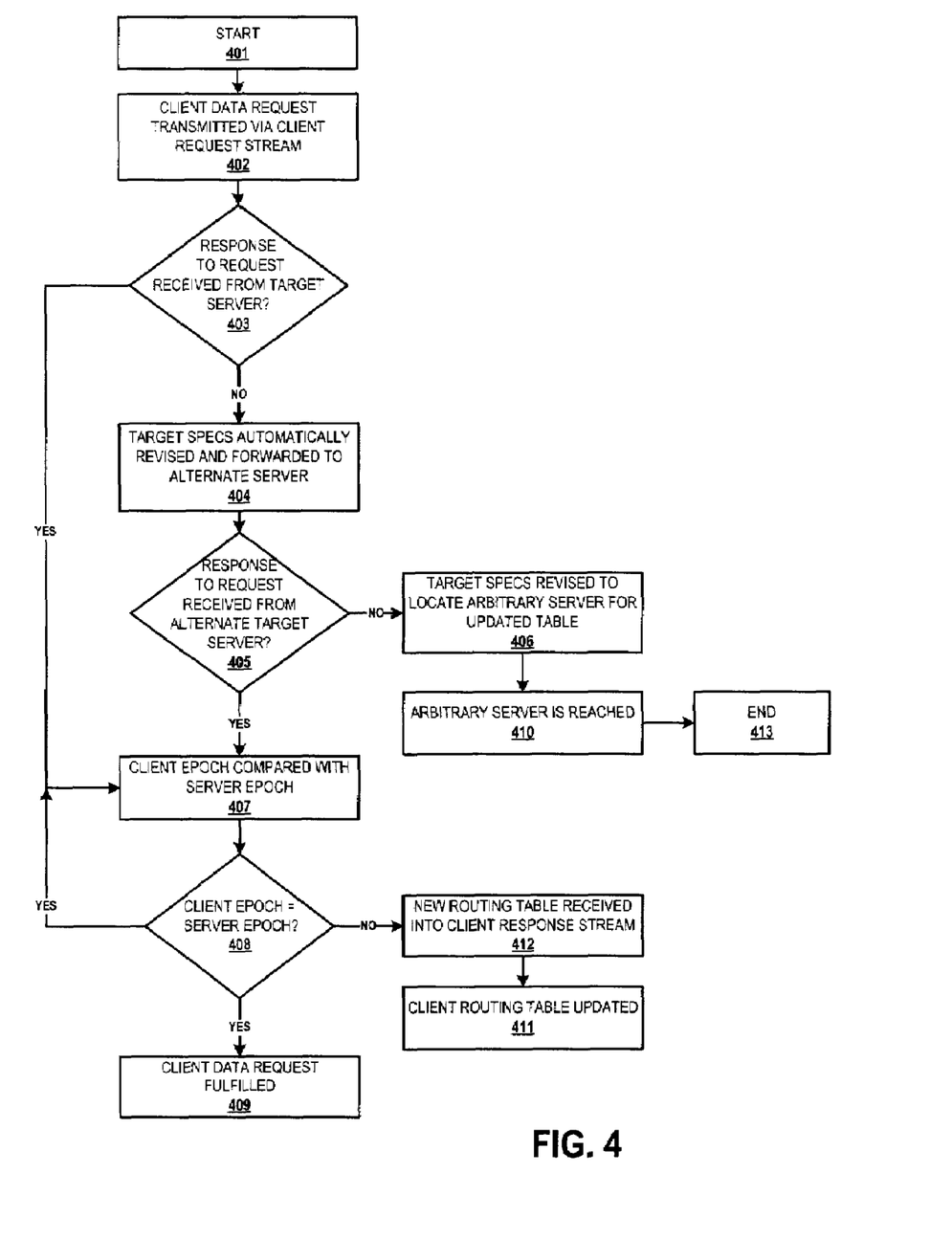
FIG. 4 is a flow chart which illustrates the process of relaxing server specifications and retrying a client request when executing the dynamic server specifications utility, according to an illustrative embodiment of the present invention.

FIG. 4 is a flow chart which illustrates the process of relaxing client request specifications and retrying a client request when executing the dynamic server specifications utility, according to an illustrative embodiment of the present invention. The process begins at initiator block 401 and proceeds to block 402 at which a client's data request is transmitted via a client request stream. A client's request is routed according to information in a client routing table. At block 403, DSS utility 110 determines whether a response indicating the successful receipt of the client's request is received from the target server. If at block 403 a response indicating the server's successful receipt of the client's request is received by the client, the client epoch is then compared to the server epoch as shown at block 407. However, if at block 403 the response to the client request is not received, i.e., no response from the target server, the target specifications are automatically relaxed and a revised request is forwarded to an alternate target server, as shown at block 404. A lack of response from the server target may have resulted from overloading or a malfunction at the server side. The automatic relaxing of constraints by DSS utility 110 allows clients to ultimately succeed in having the requests fulfilled.

At block 405, DSS utility determines whether a response to the revised request is received from the alternate target server. If at block 405 a response to the revised client request is received from the alternate target server, the client epoch is then compared to the server epoch as shown at block 407. Following the epoch comparison of block 407, DSS utility 110 determines, at block 408, whether the client epoch is equal to the server epoch. If at block 408 the client epoch is not equal to the server epoch, the process moves to block 412, at which a current routing table is inserted into the client response stream and downloaded to the client. If at block 408 the client epoch is equal to the server epoch, the process moves to block 409, at which the client's data request is fulfilled and server access is granted to the client.

Returning to decision block 405, if a response to the revised request is not received from the alternate target server, the target specifications are automatically relaxed even further and a revised request is forwarded to an arbitrary server to obtain an updated routing table, as shown at block 406. At block 410, an arbitrary server is reached and a current routing table is inserted into the client response stream and downloaded to the client, as shown at block 412. At block 411, the client routing table is updated and the client request may be again transmitted with full constraints re-established. The process ends at block 413.

In one embodiment, if either (a) the client request cannot get any response from any server after relaxing all levels of constraints or (b) the client request metrics are not met, the client router will log all of these conditions and notify the system administrator. The administrator is notified to pay attention on the system, so that the administrator may change/modify certain constraints and/or reset the client parameters to enable communication with the servers on the network. In an alternate embodiment, the router will signal an automatic service deployment controller to adjust the server cluster deployment configuration automatically. This alternate embodiment may be implemented within a closed network, such as a corporate network with known control/configuration points or administrators.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein.

An apparatus for practicing the invention could be one or more processing devices and storage systems containing or having network access to program(s) coded in accordance with the invention. Such apparatus may be a client router, which includes hardware, software or a combination of hardware and software logic components functioning therein to provide the functionality of the described embodiments.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a device having mechanisms for communicating with a plurality of application servers via a network, a method comprising:

transmitting an initial request via a client router to a first target server, which is identified based on information in a client routing table of the client router;

when the initial request is not acknowledged by the first target server:
  dynamically modifying a target server specification of a next request by relaxing one or more constraints, which were included in the first request, within the next request; and
  issuing the next request with the relaxed constraints to locate an alternate target server.

2. The method of claim 1, wherein said transmitting further comprises:
  selecting the first target server identified by information from the client routing table;
  appending a timestamp of the client routing table to the client request;
  transmitting the client request with the timestamp to the first target server;
  tracking a timeout period within which a response is expected from a target server to which a client request is transmitted; and
  initiating the dynamic modifying when no response is received from the target server before the timeout period expires.

3. The method of claim 2, wherein, when a response is received from one of the first target server and the alternate server, said method comprises:
  replacing the client routing table with a current routing table that has a more current timestamp than the client routing table, wherein the current routing table is automatically provided from the target server in response to receipt at the target server of a the client request with a timestamp that is earlier than a current timestamp of the current routing table of the target server;
  selecting a correct target server from the current routing table and generating a new client request including the correct target server and full constraints; and
  forwarding the new client request to the correct target server identified within the current routing table.

4. The method of claim 1, wherein said modifying further comprises:
  forwarding the next client request with relaxed constraints to an alternate server; and
  when the forwarded request does not reach the alternate server:
    further revising server specifications of a subsequent request by relaxing one or more of the constraints to enable contact with an arbitrary server; and
    transmitting the subsequent client request to the arbitrary server.

5. The method of claim 4, further comprising:
  appending a pre-defined low timestamp value to the subsequent client request, which indicates to the arbitrary server that the arbitrary server should immediately forward to the requesting client router a current routing table, wherein the appending is initiated when there is insufficient information in the client routing table for a client request to be properly routed; and
  when a response is received from the arbitrary server:
    replacing the client routing table with the current routing table when the current routing table is provided in response to the client request;
    selecting a correct target server from the current routing table and generating a new client request including the correct target server and full constraints; and
    forwarding the new client request to the correct target server.

6. The method of claim 1, wherein when one of (a) the client request does not receive a response from any arbitrary server after relaxing all levels of constraints and (b) required metrics associated with the client requests are not met, said method further comprising at least one of:
  logging all of conditions and notify a system administrator to pay attention on the system and change certain constraints and reset client parameters to enable communication with target servers on the network; and
  signaling an automatic service deployment controller to adjust the server cluster deployment configuration automatically.

7. The method of claim 1, wherein when the client router provides server functionality, said method further comprises:
  responsive to a receipt of a network-transmitted client request, checking a timestamp appended to the client request representing the timestamp of the client routing table of an originating client from which the client request originated;
  downloading a current routing table to the originating client to update the client routing table of the originating client when the timestamp comprises one of the following qualities:
    (a) an earlier timestamp than the timestamp of the current routing table;
    (b) a timestamp that is not equivalent to the timestamp of the target server; and
    (c) a timestamp with a pre-defined negative value indicating a request to automatically download a new routing table to the originating client; and
  when the timestamps of the client and the target server are equivalent, granting access to the originating client in response to receipt of the client request from the originating client.

8. A router for use in communicating between a client and one or more target servers within a network, said router comprising:
  means for communicatively connecting to the client and the one or more target servers;
  logic for transmitting an initial request via a client router to a first target server, which is identified based on information in a client routing table of the client router;
  when the initial request is not acknowledged by the first target server:
    logic for dynamically modifying a target server specification of a next request by relaxing one or more constraints, which were included in the first request, within the next request; and
    logic for issuing the next request with the relaxed constraints to locate an alternate target server.

9. The router of claim 8, wherein said logic for transmitting further comprises:
  logic for selecting the first target server identified by information from the client routing table;
  logic for appending a timestamp of the client routing table to the client request;
  logic for transmitting the client request with the timestamp to the first target server;
  logic for tracking a timeout period within which a response is expected from a target server to which a client request is transmitted; and
  logic for initiating the dynamic modifying when no response is received from the target server before the timeout period expires.

10. The router of claim 9, wherein, when a response is received from one of the first target server and the alternate server, said router comprises:

logic for replacing the client routing table with a current routing table that has a more current timestamp than the client routing table, wherein the current routing table is automatically provided from the target server in response to receipt at the target server of a the client request with a timestamp that is earlier than a current timestamp of the current routing table of the target server;

logic for selecting a correct target server from the current routing table and generating a new client request including the correct target server and full constraints; and  logic for forwarding the new client request to the correct target server identified within the current routing table.

11. The router of claim 8, wherein said logic for modifying further comprises:

logic for forwarding the next client request with relaxed constraints to an alternate server; and  when the forwarded request does not reach the alternate server:

logic for further revising server specifications of a subsequent request by relaxing one or more of the constraints to enable contact with an arbitrary server; and   logic for transmitting the subsequent client request to the arbitrary server.

12. The router of claim 11, further comprising:

logic for appending a pre-defined low timestamp value to the subsequent client request, which indicates to the arbitrary server that the arbitrary server should immediately forward to the requesting client router a current routing table, wherein the appending is initiated when there is insufficient information in the client routing table for a client request to be properly routed; and  when a response is received from the arbitrary server:

logic for replacing the client routing table with the current routing table when the current routing table is provided in response to the client request;

logic for selecting a correct target server from the current routing table and generating a new client request including the correct target server and full constraints; and   logic for forwarding the new client request to the correct target server.

13. The router of claim 8, wherein when one of (a) the client request does not receive a response from any arbitrary server after relaxing all levels of constraints and (b) required metrics associated with the client requests are not met, said logic further comprising at least one of:

logic for logging all of conditions and notify a system administrator to pay attention on the system and change certain constraints and reset client parameters to enable communication with target servers on the network; and  logic for signaling an automatic service deployment controller to adjust the server cluster deployment configuration automatically.

14. The router of claim 8, wherein when the client router provides server functionality, said router further comprises:

logic for responsive to a receipt of a network-transmitted client request, checking a timestamp appended to the client request representing the timestamp of the client routing table of an originating client from which the client request originated;

logic for downloading a current routing table to the originating client to update the client routing table of the originating client when the timestamp comprises one of the following qualities:

(d) an earlier timestamp than the timestamp of the current routing table;

(e) a timestamp that is not equivalent to the timestamp of the target server; and   (f) a timestamp with a pre-defined negative value indicating a request to automatically download a new routing table to the originating client; and  when the timestamps of the client and the target server are equivalent, logic for granting access to the originating client in response to receipt of the client request from the originating client.

15. A computer program product comprising a computer readable medium having program code thereon, wherein the program code executes to perform the functions of:

transmitting an initial request via a client router to a first target server, which is identified based on information in a client routing table of the client router;

when the initial request is not acknowledged by the first target server:

dynamically modifying a target server specification of a next request by relaxing one or more constraints, which were included in the first request, within the next request; and   issuing the next request with the relaxed constraints to locate an alternate target server.

16. The computer program product of claim 15, wherein said program code for transmitting further comprises code for:

selecting the first target server identified by information from the client routing table;

appending a timestamp of the client routing table to the client request;

transmitting the client request with the timestamp to the first target server;

tracking a timeout period within which a response is expected from a target server to which a client request is transmitted; and  initiating the dynamic modifying when no response is received from the target server before the timeout period expires.

17. The computer program product of claim 16, wherein, when a response is received from one of the first target server and the alternate server, said program code comprises code for:

replacing the client routing table with a current routing table that has a more current timestamp than the client routing table, wherein the current routing table is automatically provided from the target server in response to receipt at the target server of a the client request with a timestamp that is earlier than a current timestamp of the current routing table of the target server;

selecting a correct target server from the current routing table and generating a new client request including the correct target server and full constraints; and  forwarding the new client request to the correct target server identified within the current routing table.

18. The computer program product of claim 15, wherein said program code for modifying further comprises code for:

forwarding the next client request with relaxed constraints to an alternate server;

when the forwarded request does not reach the alternate server:

further revising server specifications of a subsequent request by relaxing one or more of the constraints to enable contact with an arbitrary server; and transmitting the subsequent client request to the arbitrary server; and when one of (a) the client request does not receive a response from any arbitrary server after relaxing all levels of constraints and (b) required metrics associated with the client requests are not met, said program code further comprising code for performing at least one of:

logging all of conditions and notify a system administrator to pay attention on the system and change certain constraints and reset client parameters to enable communication with target servers on the network; and signaling an automatic service deployment controller to adjust the server cluster deployment configuration automatically.

19. The computer program product of claim 18, further comprising program code for:

appending a pre-defined low timestamp value to the subsequent client request, which indicates to the arbitrary server that the arbitrary server should immediately forward to the requesting client router a current routing table, wherein the appending is initiated when there is insufficient information in the client routing table for a client request to be properly routed; and when a response is received from the arbitrary server:

replacing the client routing table with the current routing table when the current routing table is provided in response to the client request;

selecting a correct target server from the current routing table and generating a new client request including the correct target server and full constraints; and forwarding the new client request to the correct target server.

20. The computer program product of claim 15, wherein when the client router provides server functionality, said program code further comprises code for:

responsive to a receipt of a network-transmitted client request, checking a timestamp appended to the client request representing the timestamp of the client routing table of an originating client from which the client request originated;

downloading a current routing table to the originating client to update the client routing table of the originating client when the timestamp comprises one of the following qualities:

(g) an earlier timestamp than the timestamp of the current routing table;

(h) a timestamp that is not equivalent to the timestamp of the target server; and (i) a timestamp with a pre-defined negative value indicating a request to automatically download a new routing table to the originating client; and when the timestamps of the client and the target server are equivalent, granting access to the originating client in response to receipt of the client request from the originating client.

* * * * *